(12) United States Patent
Ito et al.

(10) Patent No.: US 8,644,877 B2
(45) Date of Patent: Feb. 4, 2014

(54) TERMINAL APPARATUS, BASE STATION APPARATUS DETECTION METHOD, WIRELESS COMMUNICATION SYSTEM, AND BASE STATION APPARATUS

(75) Inventors: Akira Ito, Kawasaki (JP); Yoshihiro Kawasaki, Kawasaki (JP); Yoshiharu Tajima, Kawasaki (JP); Yoshiaki Ohta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 703 days.

(21) Appl. No.: 12/469,088

(22) Filed: May 20, 2009

(65) Prior Publication Data

US 2010/0035622 A1 Feb. 11, 2010

(30) Foreign Application Priority Data

Aug. 8, 2008 (JP) ................. 2008-205522

(51) Int. Cl.
*H04B 7/00* (2006.01)
(52) U.S. Cl.
USPC ........................................................ 455/525
(58) Field of Classification Search
USPC .............. 455/436, 522, 525, 422.1, 446, 444, 455/561, 435.1, 456.1, 411, 414.2, 101, 39; 370/331, 332, 350, 343, 259, 328, 329, 370/335, 337; 375/224, 354
See application file for complete search history.

(56) References Cited

U.S. PATENT DOCUMENTS

| | | | |
|---|---|---|---|
| 5,887,260 A | 3/1999 | Nakata | |
| 5,953,323 A | 9/1999 | Haartsen | |
| 6,526,091 B1 * | 2/2003 | Nystrom et al. | 375/142 |
| 7,145,890 B1 * | 12/2006 | Seo et al. | 370/331 |
| 2005/0070283 A1 | 3/2005 | Hashimoto et al. | |
| 2007/0010280 A1 * | 1/2007 | Zalio et al. | 455/525 |
| 2007/0178933 A1 * | 8/2007 | Nelson | 455/550.1 |

(Continued)

FOREIGN PATENT DOCUMENTS

| | | |
|---|---|---|
| CA | 2672124 | 7/2008 |
| EP | 1947889 | 7/2008 |

(Continued)

OTHER PUBLICATIONS

Notification of Reason for Rejection issued for corresponding Japanese Application No. 2008-205522, dispatched Oct. 2, 2012, with English translation.

(Continued)

*Primary Examiner* — Edward Urban
*Assistant Examiner* — Golam Sorowar
(74) *Attorney, Agent, or Firm* — Myers Wolin, LLC

(57) ABSTRACT

A terminal apparatus in a wireless communication system having a first and second base station group, and for which access is permitted for a specific base station, and not for a base station other than the specific base station, in the base station belonging to the second base station group, including: a reception unit which receives an identifier from any of base stations belonging to the first base station group; and a detection unit which executes base station detection processing for the second base station group, if the received identifier is an identifier of a base station corresponding to the specific base station in the base station belonging to the first base station group, and restrict execution of the base station detection processing, if not the identifier of the base station corresponding to the specific base station in the base station belonging to the first base station group.

18 Claims, 8 Drawing Sheets

(56) References Cited

U.S. PATENT DOCUMENTS

| | | |
|---|---|---|
| 2008/0117836 A1* | 5/2008 | Savoor et al. ............... 370/254 |
| 2008/0146226 A1 | 6/2008 | Claussen et al. |
| 2008/0153533 A1 | 6/2008 | Claussen et al. |
| 2008/0227447 A1* | 9/2008 | Jeong et al. ............... 455/434 |
| 2011/0182239 A1 | 7/2011 | Aoyagi |

FOREIGN PATENT DOCUMENTS

| | | |
|---|---|---|
| JP | 9-84095 | 3/1997 |
| JP | 2001-501389 | 1/2001 |
| JP | 2005-109570 | 4/2005 |
| WO | 01/11804 | 2/2001 |
| WO | 2007/103062 | 9/2007 |
| WO | 2007/136139 | 11/2007 |
| WO | 2010/008022 | 1/2010 |

OTHER PUBLICATIONS

Extended European Search Report issued for corresponding European Patent Application No. 09161563.3, dated Jun. 3, 2013.

3GPP TR 25.820 V8.2.0 (Sep. 2008); 3rd Generation Partnership Project; Technical Specification Group Radio Access Networks; 3G Home NodeB Study Item Technical Report (Release 8); Dated: Sep. 2008.

* cited by examiner

FIG. 2
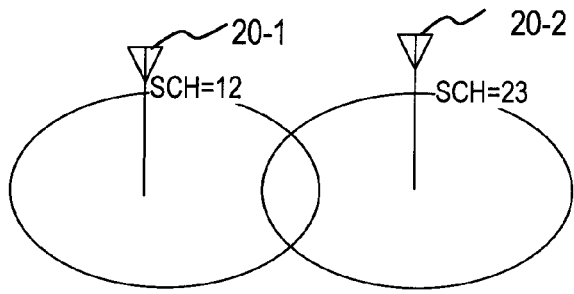
FREQUENCY 1 (MACRO)
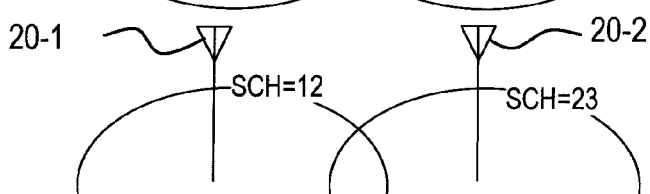
FREQUENCY 2 (MACRO)
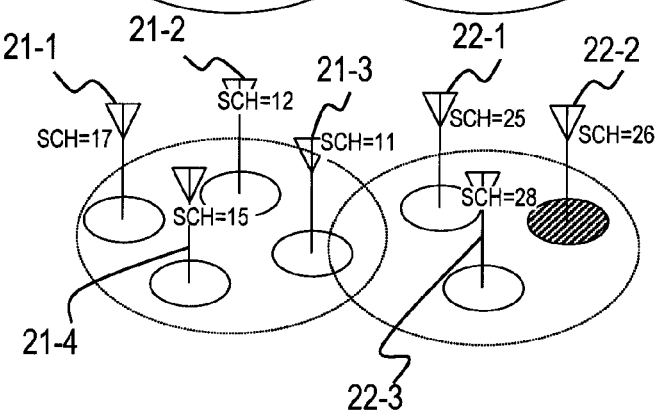
FREQUENCY 3 (FEMTO)
FIG. 3
| SCH FOR MACROCELLS | 12,15 | 21,23 | 33,35 | 44,48 |
|---|---|---|---|---|
| SCH FOR FEMTOCELLS | 11,12,13,14, 15,16,17,18 | 21,22,23,24, 25,26,27,28 | 31,32,33,34, 35,36,37,38 | 41,42,43,44, 45,46,47,48 |

| | | | | |
|---|---|---|---|---|
| FOR MACROCELLS | 0 | 64 | 128 | ...... |
| FOR FEMTOCELLS | 1-63 | 65-127 | 129-191 | ...... |

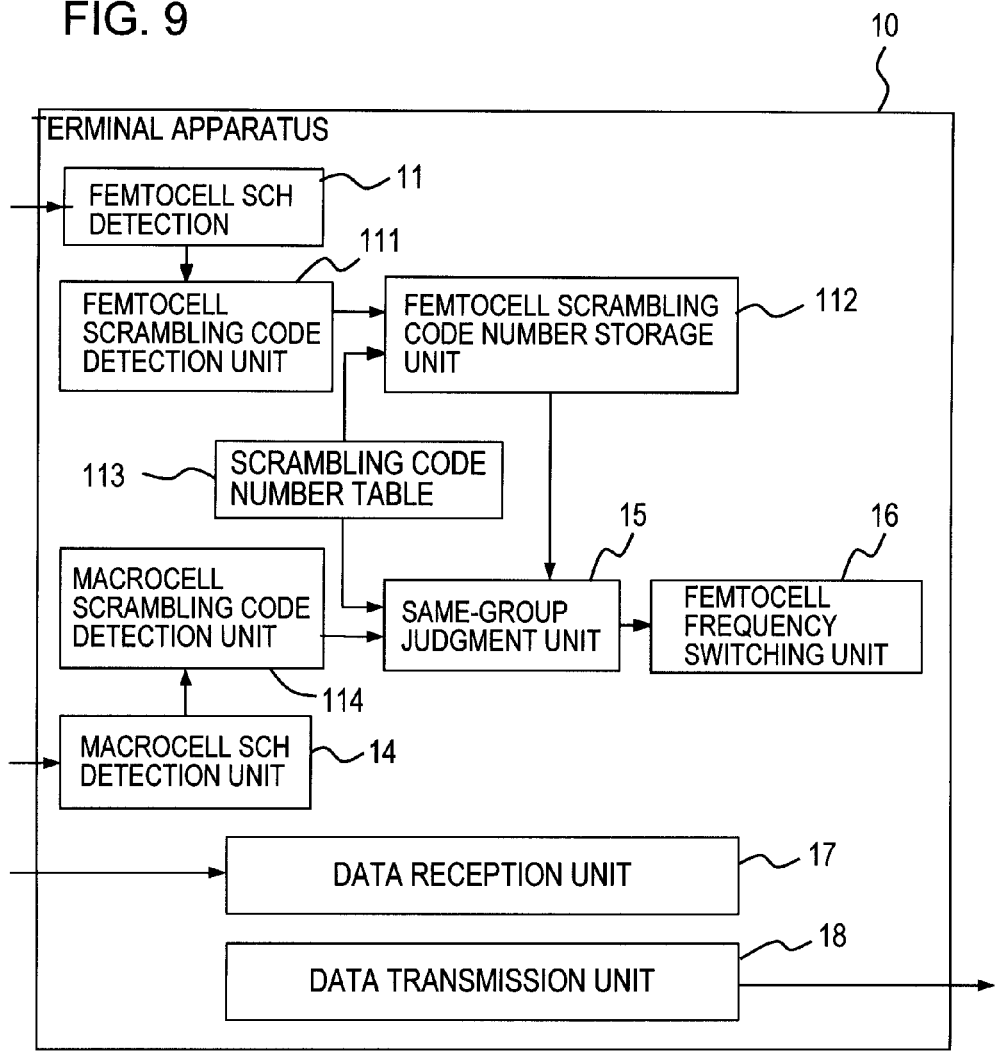

US 8,644,877 B2

TERMINAL APPARATUS, BASE STATION APPARATUS DETECTION METHOD, WIRELESS COMMUNICATION SYSTEM, AND BASE STATION APPARATUS

CROSS-REFERENCE TO RELATED APPLICATIONS

This application is based upon and claims the benefit of priority of the prior Japanese Patent Application No. 2008-205522, filed on Aug. 8, 2008, the entire contents of which are incorporated herein by reference.

FIELD

The embodiment(s) discussed herein is (are) related to a terminal apparatus, base station apparatus detection method, wireless communication system, and base station apparatus.

BACKGROUND

In the 3GPP (3rd Generation Partnership Project), studies relating to Home Node B (for example, a base station used indoors; hereafter called "femtocell") are being conducted (see for example, 3GPP TR 25.820).

A femtocell registers a useable terminal in advance, the registered terminal can communicate via the femtocell. By using the femtocell, a situation in which the terminal is out of the service area in indoor can be prevented, and the base station can be monopolized by a small number of the terminals so that communication capacity can also be increased. And the terminal can communicate with the femtocell using low transmission power. Moreover, the number of the terminals accessing base station for general use which is installed outdoors (hereafter called "macrocell") is reduced, so that throughput can be improved for the terminals using such macrocell.

However, although the femtocell is useful, in order for the terminal to detect the femtocell, frequency switching, cell searching, and other processing must be performed frequently, so that power consumption is increased. Also, to the extent that the terminal performs the processing, the time during which the terminal can be used for data reception is reduced, and throughput suffers.

Further, the terminal receives the BCH (Broadcast channel) from all detected femtocells, and extracts the cell IDs of the femtocells, by performing the terminal cell search for the femtocell. However, nearly all of the numerous femtocells are dedicated for use by other terminals, in actuality. Hence, the terminal receives the BCH from femtocell to which the terminal cannot be accessed, and to this extent the terminal power consumption is increased.

SUMMARY

According to an aspect of the invention, a terminal apparatus, which is used in a wireless communication system having a first and second base station group, and for which access is permitted for a specific base station, and access is not permitted for a base station other than the specific base station, in the base station belonging to the second base station group, the terminal apparatus including: a reception unit which receives an identifier from any of base stations belonging to the first base station group; and a detection unit which executes base station detection processing for the second base station group, if the received identifier is an identifier of a base station corresponding to the specific base station in the base station belonging to the first base station group, and restrict execution of the base station detection processing for the second base station group, if the identifier received from any of the base station belonging to the first base station group is not the identifier of the base station corresponding to the specific base station in the base station belonging to the first base station group.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 depicts an example of the configuration of a cell;
FIG. 3 depicts an example of an SCH code number table;
FIG. 9 depicts another example of the configuration of a terminal apparatus;
FIG. 10 depicts an example of a scrambling code number table; and,
FIG. 11 is a flowchart depicting an example of processing.

DESCRIPTION OF EMBODIMENT(S)

Below, preferred embodiments will be explained with reference to accompanying drawings.

Here, as an example of a first base station apparatus, a macrocell base station is used, and as an example of a second base station apparatus, a femtocell base station is used; but other configurations are possible, and a wireless communication system can be used in which one or a plurality of second base station apparatuses are arranged within the cell formed by a first base station apparatus

First Embodiment

Figure 1:
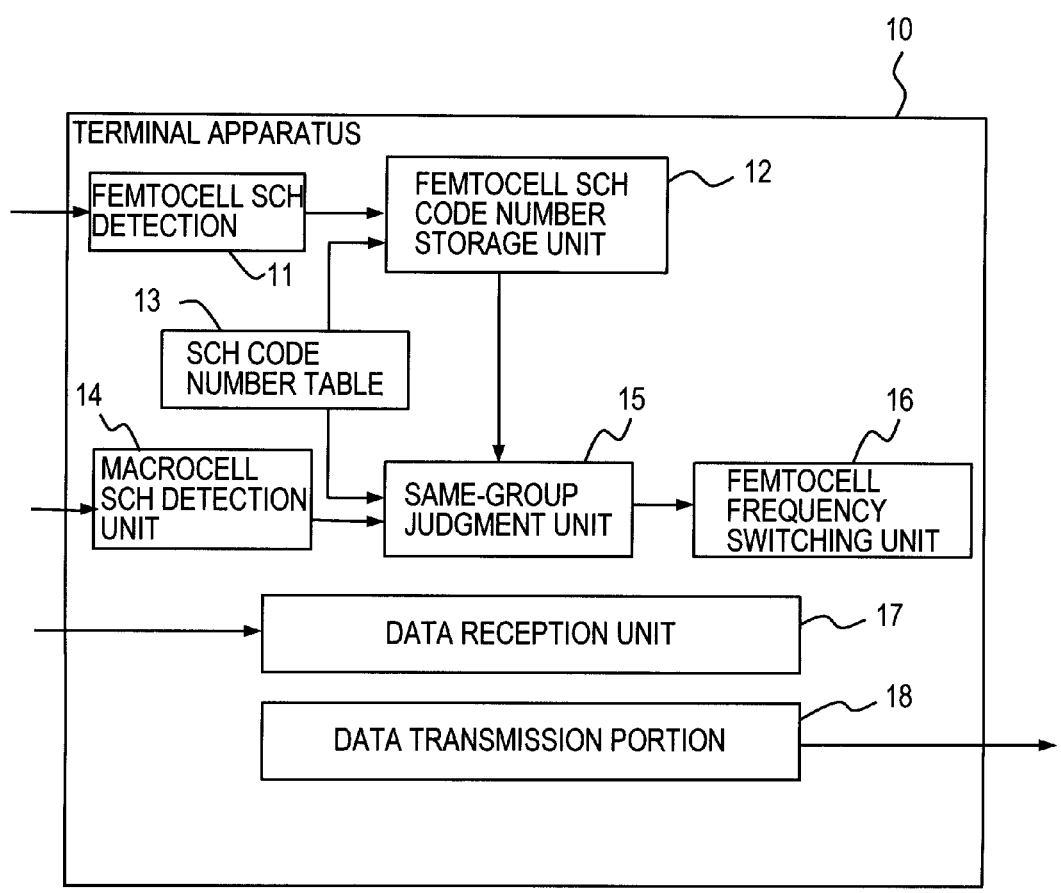
FIG. 1 depicts an example of the configuration of a terminal apparatus.

FIG. 1 depicts an embodiment of a terminal apparatus (hereafter simply "terminal") 10. The terminal 10 includes a femtocell SCH detection unit 11, femtocell SCH code number storage unit 12, SCH code number table 13, macrocell SCH detection unit 14, same group judgment unit 15, femtocell frequency switching unit 16, data reception unit 17, and data transmission unit 18.

The femtocell SCH detection unit 11 detects the SCH (synchronization channel) transmitted from a femtocell. As the femtocell, for example, a base station apparatus (hereafter "base station") installed indoors or similar can be used; the base station limits access to the terminal 10 which have been registered with the base station, and can provide Internet services and similar. In this case, the terminal not registered or not yet registered with the base station cannot use the femtocell to receive communication services. As the macrocell, the base station installed outdoors and capable of communication with the terminal 10 can be used. The number of the terminals permitted use of the macrocell can be made larger than for the femtocell, and the coverage area can also be made larger than for the femtocell.

The femtocell SCH code number storage unit 12 stores SCH code number for the femtocell which have permitted access by the terminal 10 (with which the terminal 10 is registered).

The SCH code number table 13 is a table which stores the SCH code number for the respective femtocell and macrocell. FIG. 2 depicts a configuration example of a cell, and FIG. 3 depicts an example of the SCH code number table 13.

Macrocell and femtocell are each allocated SCH code numbers determined in advance. For example, as depicted in FIG. 2, the base station (macrocell) 20-1 is allocated the SCH code number "12", the base station (macrocell) 20-2 is allocated "23", and the base station (femtocell) 21-1 is allocated "17". In the SCH code number table 13, the femtocell arranged within the cell range of the macrocell is grouped using the SCH code number. Or, the femtocell is arranged such that the SCH code number is in a group indicated by the SCH code number table 13. In other words, the correspondence relation between the macrocell and the femtocell within the macrocell (which may or may not include femtocell which is outside of but adjacent to the macrocell) is defined by the table of FIG. 3, and in particular, the table stores the femtocell 22-2 for which access is permitted in association with the macrocell 23 which includes the femtocell within the cell range of the macrocell. For example, in FIG. 2 SCH codes are assigned such that the groupings of FIG. 3 are satisfied. That is, within the area of the base station (macrocell) 20-2, there exist the base stations (femtocells) 22-1 to 22-3, so that the SCH number "23" of the base station (macrocell) 20-2 and the SCH codes "25", "26", "27" of the base stations (femtocells) 22-1 to 22-3 are decided in FIG. 3 so as be in the same group in the network design.

In the example of FIG. 3, two base stations (macrocells) with macrocell SCH code numbers of "12" and "15" have the same femtocell SCH code numbers from "11" to "18". For example, for single macrocell SCH code number there may be a plurality of femtocell SCH code numbers, and three or more macrocell SCH code numbers may have the same femtocell SCH code number.

SCH code number is also identifier used to identify cell. An example of the configuration of macrocell and femtocell (base station) is described below.

Returning to FIG. 1, the macrocell SCH detection unit 14 detects the SCH transmitted from the macrocell, and outputs the SCH code number.

The same group judgment unit 15 judges whether received the macrocell SCH code number is in the same group as stored the femtocell SCH code number. For example, when the terminal 10 is registered with the femtocell 22-2 (see FIG. 2), the SCH number of the femtocell is "26". The macrocell SCH numbers corresponding to the femtocell SCH number "26" stored in the SCH code number table 13 are "21" and "23". Hence the same group judgment unit 15 detects whether the detected macrocell SCH number is "21" or "23". Upon judging that the group is the same, the same group judgment unit 15 instructs the femtocell frequency switching unit 16 to perform frequency switching.

Upon receiving the frequency switching instruction, the femtocell frequency switching unit 16 switches from the macrocell transmission frequency to the femtocell transmission frequency.

In the present embodiment, as for example depicted in FIG. 2, each of the femtocells 21-1 to 22-3 transmits data and similar at the same frequency. The terminal 10 performs cell search and other processing for the femtocells 21-1 to 22-3 by switching to the frequency.

Further, in the present embodiment, it is assumed that the femtocell base stations 21-1 to 22-3 and the macrocell base stations 20-1 and 20-2 communicate with subordinate terminal at different respective frequencies. In this case, as for example depicted in FIG. 2, the macrocell base stations 20-1, 20-2 may communicate with the terminal 10 at two frequencies (frequency 1 and frequency 2) in order to increase the number of terminals accommodated.

The data reception unit 17 receives data from the base stations (macrocell and femtocell). The data transmission unit 18 transmits data to the base stations.

Figure 4:
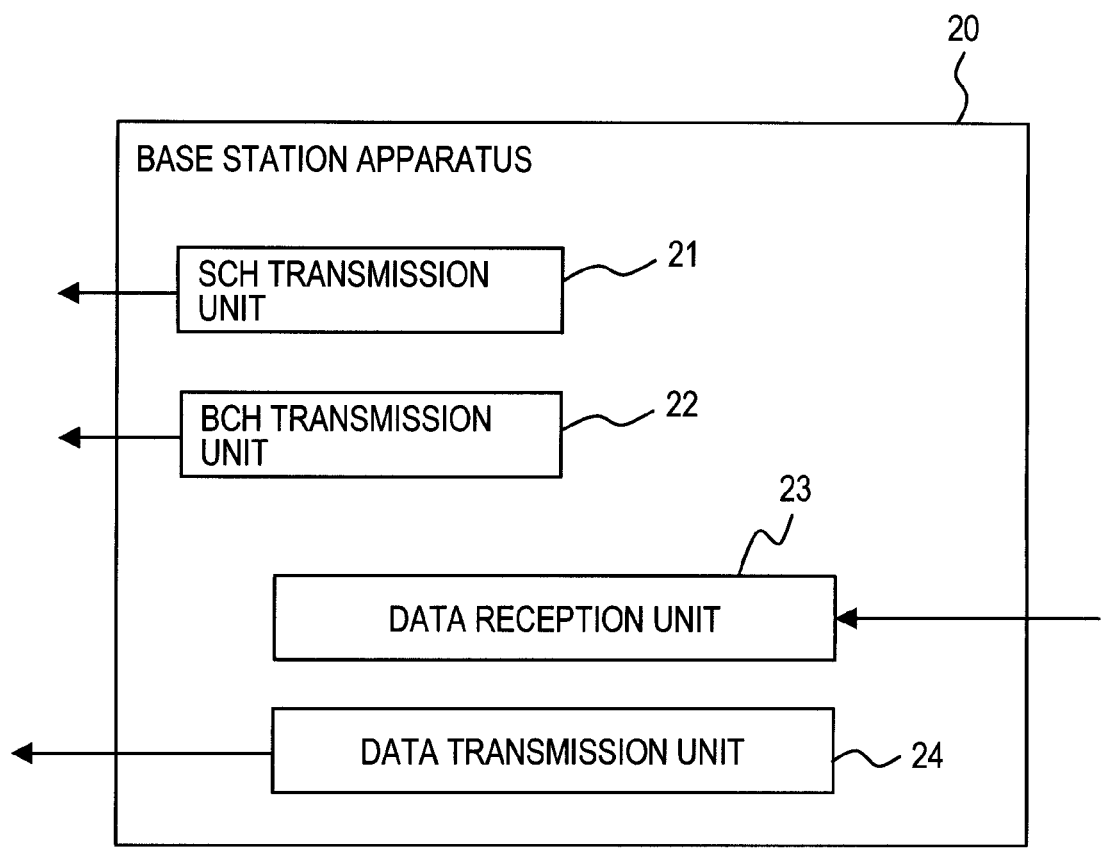
FIG. 4 depicts an example of the configuration of a base station apparatus.

FIG. 4 depicts an example of the configuration of the base station (hereafter "base station") 20. Femtocell and macrocell base stations have similar configurations. Because the cell radius of the femtocell may be small, the transmission power can be set low compared with the macrocell. The base station 20 includes an SCH transmission unit 21, BCH transmission unit 22, data reception unit 23, and data transmission unit 24.

The SCH transmission unit 21 transmits the SCH, and the BCH transmission unit 22 transmits the BCH including the cell ID. In order that the SCH code number of each base stations 20 of the femtocell and macrocell be grouped as depicted in FIG. 2, the SCH transmission unit 21 transmits the SCH of the SCH code number determined in advance. For example, in the case of the macrocell base station 20-2, the SCH transmission unit 21 transmits the SCH of the SCH number "23", and in the case of the femtocell base station 22-2, the SCH transmission unit 21 transmits the SCH of the number "26". The SCH code number allocated to each base station 20 is stored in the SCH transmission unit 21. The cell ID is similarly allocated to each base station 20, and the BCH transmission unit 22 transmits the BCH including the cell ID.

The data reception unit 23 receives data from terminal 10, and the data transmission unit 24 transmits data to terminal 10.

Figure 5:
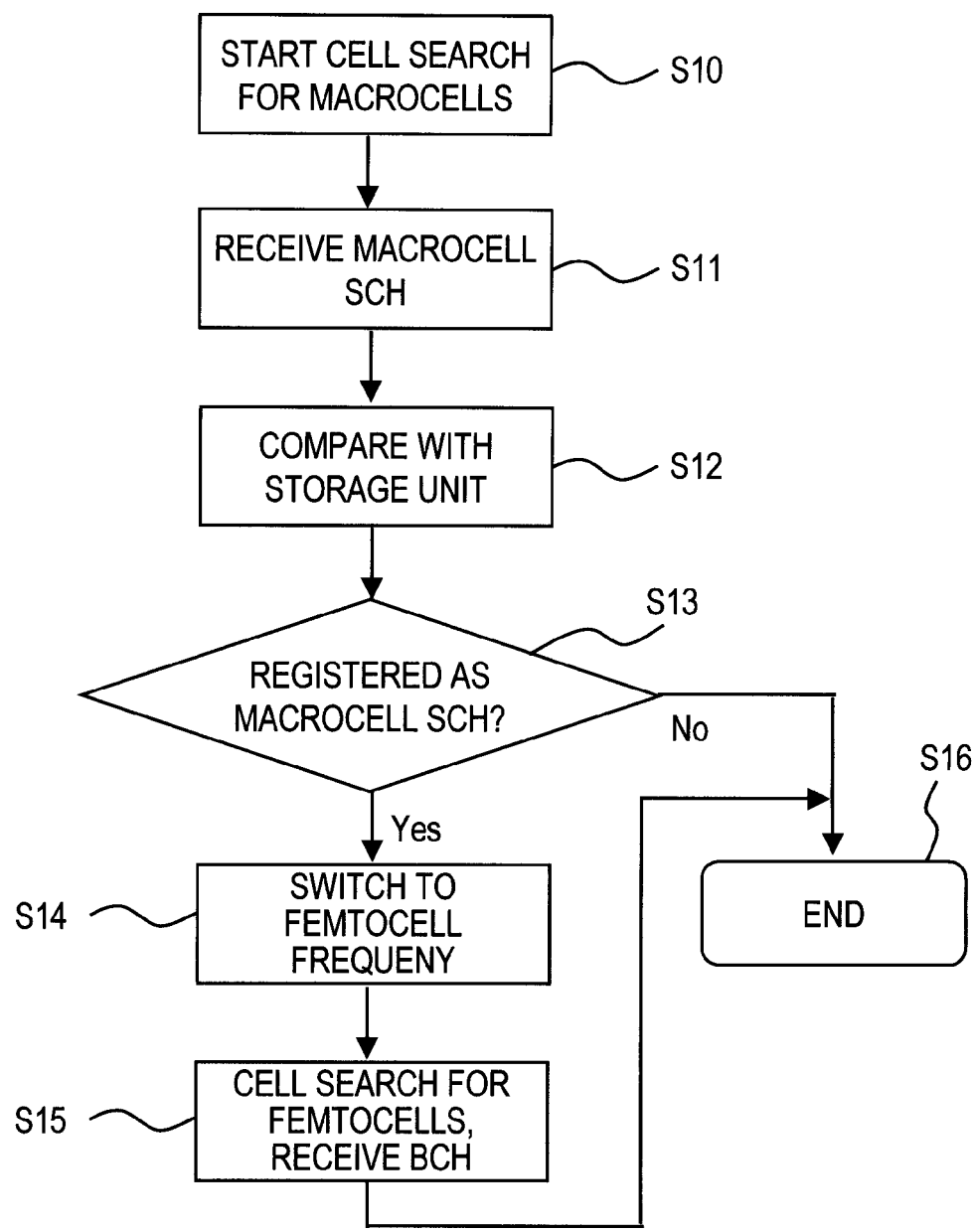
FIG. 5 is a flowchart depicting an example of processing.

Next, an operation is explained. FIG. 5 is a flowchart depicting an example of processing in the terminal 10. It is assumed that, prior to the start of the processing in the terminal 10, the femtocell detection unit 11 has received the SCH from the femtocell (for example, the femtocell 22-2) for which access has been permitted (with which registration has been completed), and the code number for the femtocell has been stored in the femtocell SCH code number storage unit 12.

First, the terminal 10 begins the cell search for the macrocell (S10). For example, the terminal 10, registered with the femtocell 22-2 (SCH code number "26"), starts the cell search when positioned in another cell close to the macrocell 20-1.

Next, the terminal 10 receives the SCH from the detected macrocell if the terminal 10 detects certain macrocell (S11). For example, the terminal 10 detects the macrocell 20-1, and receives the SCH (code number "12") from the macrocell 20-1.

Next, the same group judgment unit 15 compares the received macrocell SCH code number and the SCH code number stored in the table 13 (S12). For example, the same group judgment unit 15 reads the femtocell SCH code number (for example, "26") from the femtocell SCH code number storage unit 12, and reads the macrocell SCH code number corresponding to the read out femtocell SCH code number (for example, "21" and "23") from the SCH code number table 13. And, the same group judgment unit 15 compares the read out macrocell SCH code numbers with the SCH code number from the macrocell SCH detection unit 14 (for example, "12"), and judges whether the group is the same.

Next, the same group judgment unit 15 judges whether the received macrocell SCH number is registered as the macrocell SCH in the table 13 (S13). That is, the same group judgment unit 15 judges whether the received macrocell SCH number (for example, "12") and the SCH code number stored in the table 13 (for example, "21", "23") coincide. The macrocell SCH code numbers corresponding to the SCH code number "26" stored in the femtocell SCH code number storage unit 12 can also be identified and stored in advance, so that table reference processing need not be performed afterwards. In this case, when detecting coincidence of SCH code number, the stored femtocell SCH code number "26" itself may not be used.

When there is no coincidence ("No" in S13), the terminal 10 ends processing, without performing frequency switching to the femtocell, performing the femtocell cell search, performing BCH reception processing, or similar (S16). That is, service from the macrocell continues.

In the above described example, the stored SCHs (numbers "21" and "23") and the received SCH (number "12") do not coincide, and so the terminal 10 ends processing without performing these processing tasks. In this case, the terminal 10 is positioned within the cell range of the macrocell 20-1, and within the range, cannot detect the femtocell 22-2 with which the terminal 10 is registered even if switching to the femtocell frequency were performed. In the present embodiment, in such a case the terminal 10 does not perform frequency switching to the femtocell frequency to detect the femtocell 22-2, and does not perform processing for BCH reception from the femtocell and similar. Consequently, power consumption by the terminal 10 can be reduced compared with the case in which the processing is performed. Further, because the terminal 10 does not perform communication with the femtocell, unnecessary frequency switching for femtocell detection is omitted, and the opportunity for exchange of data with the macrocell is increased, so that throughput is improved. In this case, the terminal 10 ends the series of processing remaining in the state in which the macrocell frequency is maintained.

On the other hand, if there is coincidence ("Yes" in S13), the femtocell frequency switching unit 16 switches to the femtocell frequency (S14). And, the terminal 10 performs cell searching for the femtocell, receives the BCH from the femtocell, detects whether registration with the femtocell has been completed, and in cases in which registration has been completed, communicates with the cell (S15).

For example, when the terminal 10 is positioned within the cell range of the macrocell 20-2, the SCH (code number "23") received from the macrocell 20-2 coincides with one of the macrocell SCHs (code numbers "21", "23") stored in the table 13. In this case, the registered femtocell 22-2 is arranged within the cell range of the macrocell 20-2, and so switching to the frequency of the femtocell is performed, and through cell search processing and similar, detection of the cell 22-2 is performed.

As explained above, in the present embodiment, the terminal receives the identifier by the reception unit from the base station forming the macrocell, but when the received identifier is the identifier of the base station associated with the specific femtocell base station for which access is permitted, among the base stations belonging to the base station group including the macrocell, base station search processing is executed for the femtocell group (or for only a particular femtocell), but when the identifier received from any of the base stations belonging to the base station group including the macrocell is not the identifier of the base station associated with the specific femtocell base station for which access is permitted, execution of base station search processing for the femtocell group is regulated.

Second Embodiment

Next, a second embodiment is explained. In the second embodiment, grouping is performed using cell IDs including BCHs.

Figures 6, 7:
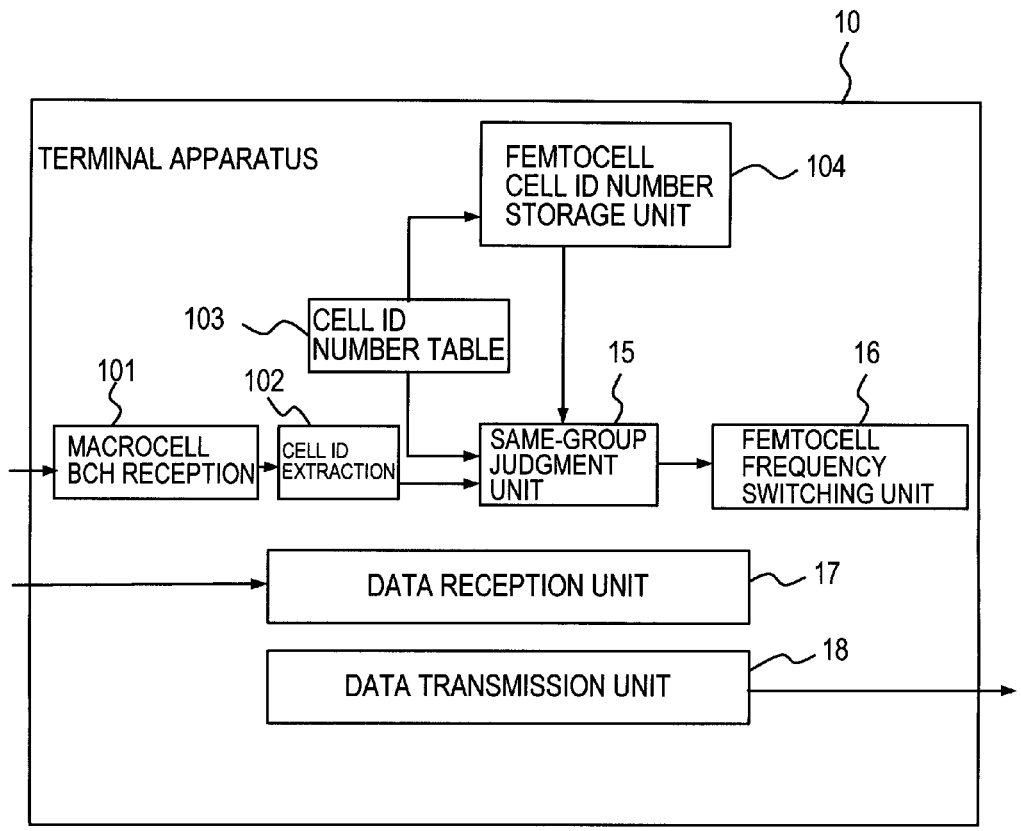
FIG. 6 depicts another example of the configuration of a terminal apparatus.
FIG. 7 depicts an example of a cell ID number table.

FIG. 6 depicts an example of the configuration of the terminal 10 in the second embodiment. The terminal 10 further includes a macrocell BCH reception unit 101, cell ID extraction unit 102, cell ID number table 103, and femtocell cell ID number storage unit 104.

The macrocell BCH reception unit 101 receives the BCH transmitted from the macrocell.

The cell ID extraction unit 102 extracts the cell ID from the received BCH.

The cell ID number table 103 is a table which groups femtocells arranged within the cell range of the macrocell by cell ID. FIG. 7 depicts an example of the cell ID number table 103. Within the cell range of the macrocell with cell ID "64", femtocells with cell IDs "65" to "127" are arranged. Or, femtocell is installed such that the cell ID reflects the arrangement. The grouping method is similar to the first embodiment in which grouping is performed by SCH code number.

In order for such grouping to be executed, each of the cell IDs allocated to macrocell and femtocell is transmitted. FIG. 4 depicts an example of the configuration of the base station 20 in the second embodiment. The BCH transmission unit 22 transmits the BCH including the cell ID allocated by each grouping. The femtocell cell ID number storage unit 104 stores the cell ID of femtocell with which the terminal 10 is registered (for which access is permitted).

Figure 8:
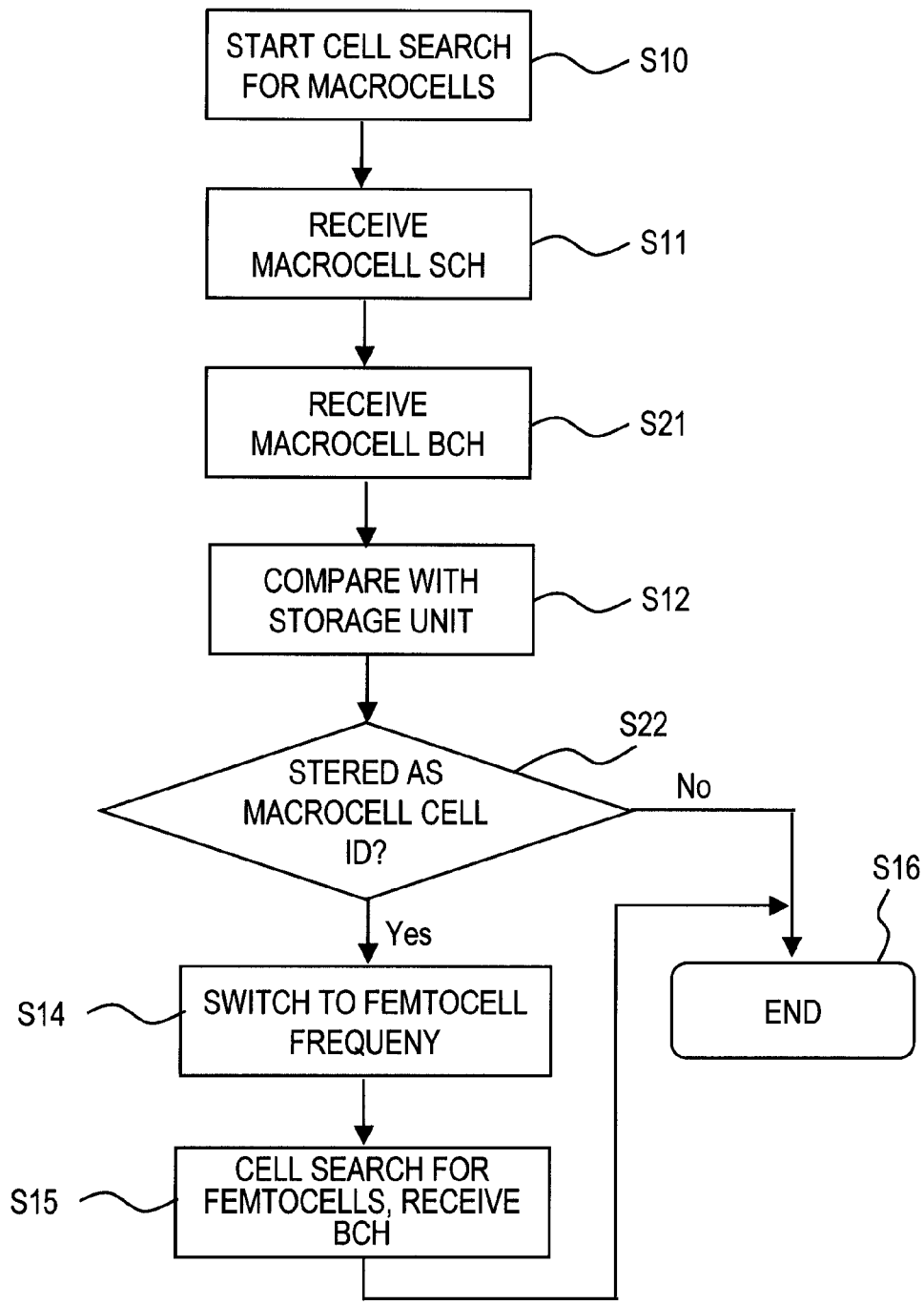
FIG. 8 is a flowchart depicting an example of processing.

FIG. 8 is a flowchart depicting an example of processing of the terminal 10 in the second embodiment. It is assumed that prior to the start of the processing, the terminal 10 stores cell ID for femtocell in the cell ID number storage unit 104.

By performing cell search for the macrocell (S10), the terminal 10 detects certain the macrocell and receives the SCH (S11). And, the macrocell BCH reception unit 101 of the terminal 10 receives the BCH from the macrocell (S21).

Next, the cell ID extraction unit 102 extracts the cell ID from the received BCH, the same group judgment unit 15 reads the femtocell cell ID from the femtocell cell ID number storage unit 104, reads the cell ID of the macrocell corresponding to the cell ID from the cell ID number table 103, and judges whether the received cell ID coincides with these (S12, S22).

When there is no coincidence ("No" in S22), the terminal 10 ends processing, without performing frequency switching to the femtocell, the femtocell cell search, BCH reception from the femtocell, or other processing (S16).

For example, when the terminal 10 is registered with the femtocell 22-2 and is positioned in the macrocell 20-1, the cell ID of the femtocell 22-2 is not included in the group of the cell ID of the macrocell 20-1. In this case, the terminal 10 ends processing without performing frequency switching to the femtocell or other processing. In the second embodiment also, the terminal 10 does not perform such processing, so that compared with cases in which frequency switching and other processing is performed, power consumption by the terminal 10 can be reduced. Moreover, unnecessary frequency switching for femtocell detection is omitted, and the opportunity for exchange of data with the macrocell is increased, so that throughput is improved.

On the other hand, when there is coincidence ("Yes" in S23), the terminal 10 performs femtocell frequency switching (S14), performs femtocell cell searching, BCH reception and similar (S15), and ends the series of processing.

For example, when the terminal 10 is positioned in the macrocell 20-2 including the femtocell 22-2 with which the terminal 10 is registered, the femtocell frequency switching unit 16 performs switching to the femtocell frequency. And, upon detecting that the terminal 10 is positioned in the cell range of the femtocell 22-2, communication with the cell 22-2 is performed.

Third Embodiment

Next, a third embodiment is explained. The third embodiment is an example in which cells are grouped by a scrambling code obtained at the time of SCH detection. FIG. 9 depicts an example of the configuration of the terminal 10. An example of the configuration of the base station 20 is similar to that of the first embodiment in FIG. 4.

The terminal 10 further includes a femtocell scrambling code detection unit (hereafter in the third embodiment, "femtocell code detection unit") 111, femtocell scrambling code number storage unit (hereafter in the third embodiment, "code number storage unit") 112, scrambling code number table (hereafter in the third embodiment, "code number table") 113, and macrocell scrambling code detection unit (hereafter in the third embodiment, "macrocell code detection unit") 114.

Based on the SCH detected by the femtocell SCH detection unit 11, the femtocell code detection unit 111 detects the scrambling code number for the femtocell with which the terminal 10 is registered. For example, based on timing or other information obtained through SCH detection, the femtocell code detection unit 111 detects the femtocell scrambling code.

The code number storage unit 112 stores the scrambling code number for the femtocell with which the terminal 10 is registered. The code number is stored in the code number storage unit 112 in advance when the terminal 10 is positioned within the femtocell and registers with the femtocell.

The code number table 113 is a table which groups femtocells arranged within the cell range of the macrocell by scrambling code numbers. FIG. 10 depicts an example of the code number table 113. Within the cell ranges of the macrocells with scrambling code numbers "20" and "25" are arranged femtocells with scrambling code numbers "17" to "32". Or, femtocell is installed such that scrambling code number reflects the arrangement. The grouping method is similar to that in the first embodiment in which grouping is performed by SCH code number.

Based on the macrocell SCH detected by the macrocell SCH detection unit 14, the macrocell code detection unit 114 detects the scrambling code number of the macrocell. For example, the macrocell code detection unit 114 detects the code number based on the timing or other information obtained in SCH detection. The macrocell code detection unit 114 outputs the detected code number to the same group judgment unit 15.

Figure 11:
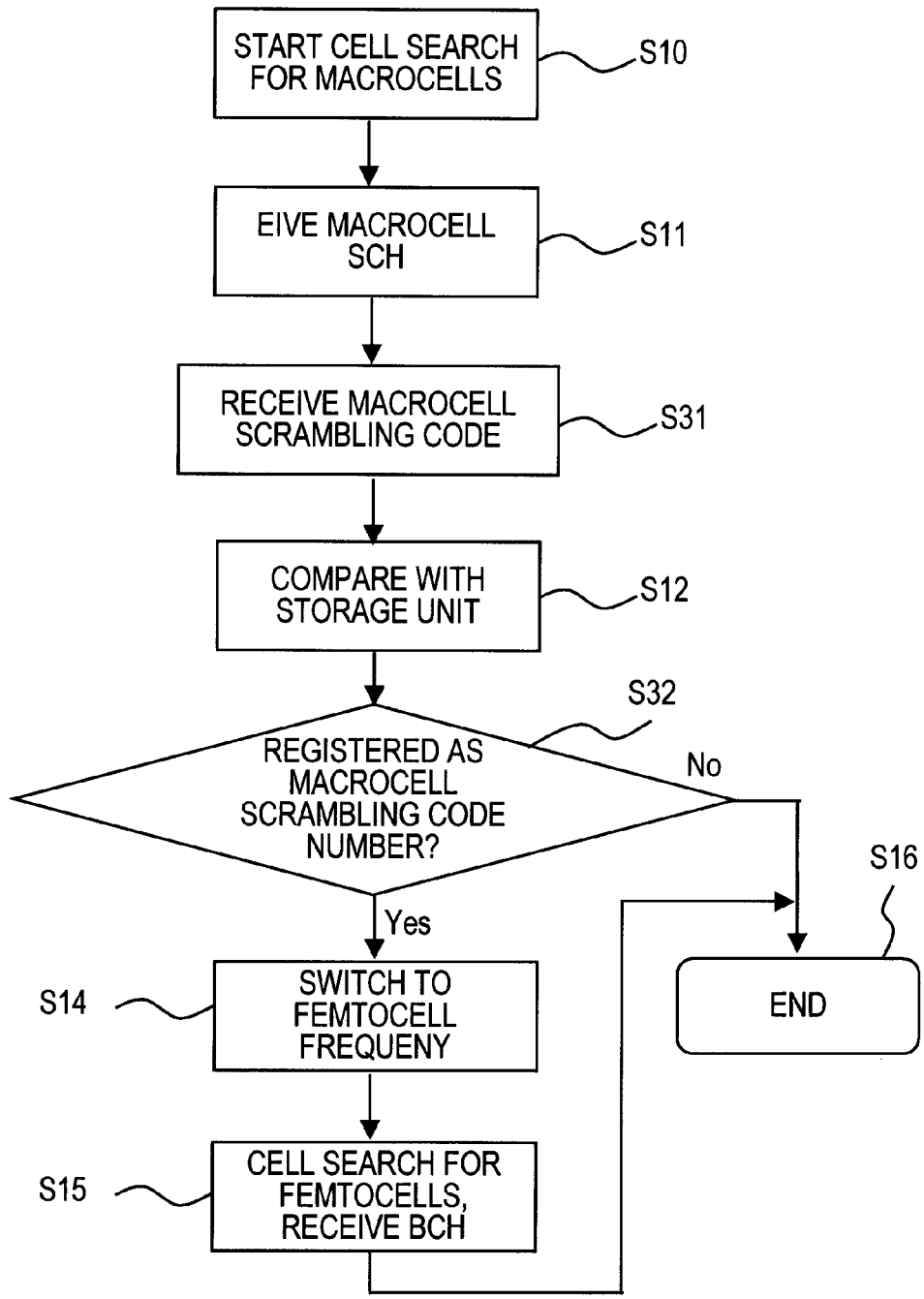

FIG. 11 is a flowchart depicting an example of processing in the terminal 10. After macrocell SCH detection (S11), the macrocell code detection unit 114 of the terminal 10 detects the scrambling code number for the macrocell (S31).

Next, the same group judgment unit 15 reads femtocell scrambling code numbers from the code number storage unit 112, reads the corresponding macrocell scrambling code number from the code number table 113, and judges whether the received scrambling code number coincides (S12, S32).

When there is no coincidence ("No" in S32), the terminal 10 ends processing without performing switching to a femtocell frequency, femtocell cell search, BCH reception from the femtocell, or other processing (S16).

On the other hand, when there is coincidence ("Yes" in S32), the terminal 10 switches to the femtocell frequency (S14), performs cell search, BCH reception, and other processing for the femtocell, and ends the series of processing (S15, S16). Thereafter, upon detecting the femtocell with which it is registered, the terminal 10 communicates with the cell.

In the third embodiment also, when for example the terminal 10 is positioned within the cell range of the macrocell 20-1, the terminal 10 receives the scrambling code number which is different from that of the macrocell 20-2 having the registered femtocell 22-1 in its cell range ("No" in S32). In this case, the terminal 10 ends processing without performing frequency switching or other processing (S16). Hence power consumption by the terminal 10 can be reduced, and throughput can be improved.

Moreover, in the third embodiment, compared with the second embodiment, BCH reception processing (S21) can be omitted when performing same group judgment (S32), so that power consumption can be further reduced.

The third embodiment is advantageous when using scrambling code number for cell identification, as in W-CDMA and other systems.

Other Embodiments

In the first to third embodiments, various judgments performed by the same group judgment unit 15 are conceivable. For example, in the first embodiment, the femtocell SCH code number storage unit 12 may read from the SCH code number table 13 and store the code number of the macrocell corresponding to the stored SCH code number. The same group judgment unit 15 can compare the macrocell SCH code numbers stored in the storage unit 12 with the received macrocell SCH code number. Similar processing is possible in the second and third embodiments as well.

Also, in the first to third embodiments, explanations assumed that the frequencies used for communication of the terminal 10 with macrocells and femtocells is different (FIG. 2 and similar). Even when the two frequencies are the same, implementation is possible. In this case, in the SCH code number table 13 depicted in FIG. 3, completely different number is allocated as the femtocell SCH code number and as the macrocell SCH code number. Similarly in the second and third embodiments, the ID and similar are allocated so as to be completely different for macrocell and for femtocell. This is because, even when the code number is the same, if the frequency is different, the terminal 10 can identify code number from different cell.

Further, in the first embodiment, the SCH code number table 13 and the femtocell SCH code number storage unit 12 may be implemented in a single configuration, rather than with separate configurations; and similarly in the second and third embodiments also.

The terminal apparatus, base station apparatus detection method, wireless communication system, and base station apparatus which reduce power consumption can be provided. Moreover, the terminal apparatus and similar with improved throughput can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

The invention claimed is:

1. A terminal apparatus, which is used in a wireless communication system having a first and second base station group, and for which access is permitted for a specific base station, and access is not permitted for a base station other than the specific base station, in the base station belonging to the second base station group, the terminal apparatus comprising:
    a reception unit receives an identifier from any of base stations belonging to the first base station group; and
    a detection unit executes base station detection processing for the second base station group, if the received identifier is an identifier of a base station that belongs to the first base station group and corresponds to the specific base station, wherein the specific base station belongs to the second base station group and is located in cell formed by the base station belonging to the first base station group, and the detection unit restricts execution of the base station detection processing for the second base station group, if the received identifier is not the identifier of the base station that belongs to the first base station group and corresponds to the specific base station that belongs to the second base station group, said detection unit further includes a set of relationships between one or more base stations in the first base station group and one or more base stations in the second base station group within a coverage area of said one or more base stations in the first base station group, wherein execution of the base station detection processing is based on a relationship, in the set of relationships, between the specific base station in the second base station group and a base station in the first base station group.

2. The terminal apparatus according to claim 1, wherein the specific base station, which belongs to the second base station group, is located in a cell formed by the base station, which belongs to the first base station group and which corresponds to the specific base station.

3. The terminal apparatus according to claim 1, wherein the detection unit executes the base station detection processing by switching to a transmission frequency of the specific base station in the second base station group.

4. The terminal apparatus according to claim 1, wherein the identifier is a synchronization channel (SCH).

5. The terminal apparatus according to claim 1, wherein the identifier is a cell ID included in a broadcast channel (BCH).

6. The terminal apparatus according to claim 1, wherein the identifier is a scrambling code.

7. A base station detection method for a terminal apparatus, which is used in a wireless communication system having a first and second base station group, and for which access is permitted for a specific base station, and access is not permitted for a base station other than the specific base station, in the base station belonging to the second base station group, the base station detection method comprising:
    receiving an identifier from any of base stations belonging to the first base station group; and
    executing base station detection processing for the second base station group, if the received identifier is an identifier of a base station that belongs to the first base station group and corresponds to the specific base station, wherein the specific base station belongs to the second base station group and is located in cell formed by the base station belonging to the first base station group, and restricting execution of the base station detection processing for the second base station group, if the received identifier is not the identifier of the base station that belongs to the first base station group and corresponds to the specific base station that belongs to the second base station group, wherein a set of relationships is defined between one or more base stations in the first base station group and one or more base stations in the second base station group within a coverage area of said one or more base stations in the first base station group, wherein the base station detection processing is executed based on a relationship, in the set of relationships, between the specific base station in the second base station group and a base station in the first base station group.

8. The base station detection method according to claim 7, wherein the specific base station, which belongs to the second base station group, is located in a cell formed by the base station, which belongs to the first base station group and which corresponds to the specific base station.

9. The base station detection method according to claim 7, wherein the base station detection processing is executed by switching to a transmission frequency of the specific base station in the second base station group.

10. The base station detection method according to claim 7, wherein the identifier is a synchronization channel (SCH).

11. The base station detection method according to claim 7, wherein the identifier is a cell ID included in a broadcast channel (BCH).

12. The base station detection method according to claim 7, wherein said identifier is a scrambling code.

13. A wireless communication system, comprising:
    a first base station group;
    a second base station group; and
    a terminal apparatus which is permitted access for a specific base station, and is not permitted access for a base station other than the specific base station, in the base station belonging to the second base station group, wherein
    the terminal including:
    a reception unit receives an identifier from any of base stations belonging to the first base station group, and
    a detection unit executes base station detection processing for the second base station group, if the received identifier is an identifier of a base station that belongs to the first base station group and corresponds to the specific base station, wherein the specific base station belongs to the second base station group and is located in cell formed by the base station belonging to the first base station group, and the detection unit restricts execution of the base station detection processing for the second base station group, if the received identifier is not the identifier of the base station that belongs to the first base station group and corresponds to the specific base station that belongs to the second base station group, said detection unit further includes a set of relationships between one or more base stations in the first base station group and one or more base stations in the second base station group within a coverage area of said one or more base stations in the first base station group, wherein execution of the base station detection processing is based on a relationship, in the set of relationships, between the specific base station in the second base station group and a base station in the first base station group.

14. The wireless communication system according to claim 13, wherein the specific base station, which belongs to the second base station group, is located in a cell formed by the base station, which belongs to the first base station group and which corresponds to the specific base station.

15. The wireless communication system according to claim 13, wherein the detection unit executes the base station detection processing by switching to a transmission frequency of the specific base station in the second base station group.

16. The wireless communication system according to claim 13, wherein the identifier is a synchronization channel (SCH).

17. The wireless communication system according to claim 13, wherein the identifier is a cell ID included in a broadcast channel (BCH).

18. The wireless communication system according to claim 13, wherein the identifier is a scrambling code.

* * * * *